Patented Oct. 30, 1934

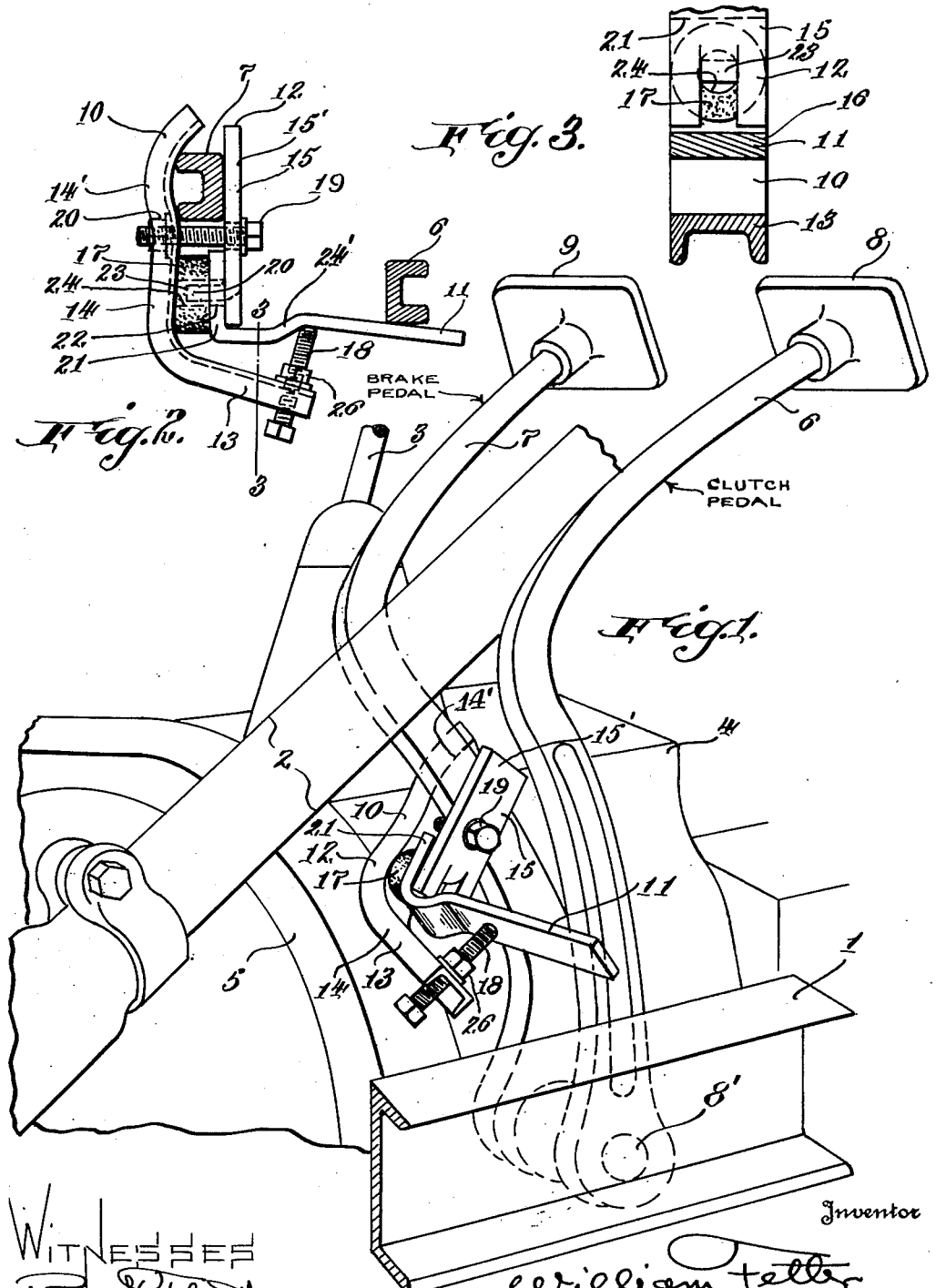

1,979,029

UNITED STATES PATENT OFFICE 1,979,029

BRAKE CONTROL

William Fetter, Baltimore, Md.

Application March 27, 1934, Serial No. 717,557

4 Claims. (Cl. 192—13)

The invention relates to a brake control for motor vehicles. In the operation of such vehicles in traffic, particularly at highway intersections which are approached at grade, considerable difficulty is encountered because of the necessity for depressing both the clutch pedal and the brake pedal to hold the vehicle stationary and for operating the foot throttle or accelerator at the same time to maintain the desired speed of the motor and to prevent choking of the motor when the vehicle is again started. While it is possible to overcome this difficulty in part by use of the hand throttle, this is not easy for the majority of motorists who have become used to the foot throttle and can not easily shift from one to the other. Also, a considerable proportion of the motor cars manufactured are not provided with this latter mechanism at least in a form which is convenient to operate in this way to control the speed of the vehicle.

The object of the present invention is to overcome these difficulties by the provision of a combined control which, while it permits the brake to be applied independently of the clutch and permits the clutch to be released independently of the brake, operates the brake when the clutch pedal is completely depressed or depressed below the position of normal release. While the prior art patents include combined controls for the brake and clutch which are adapted for use with hydraulic brakes only, the present device is adapted for use with either hydraulic or mechanical brakes, and while the prior art patents further include the provision of means for so connecting the clutch and brake pedals that the brake may be operated by means of the clutch pedal or vice versa, this latter construction lacks the convenience of attachment and adjustment of the improved equipment which is instantaneously applied to any car and universally adjustable by means of a single screw without releasing for resetting.

The improved construction is not only adapted for attachment to any and every type of car which is provided with a brake and a clutch pedal in accordance with the standard practice, but it is provided with adjustable means and in the form of a single screw which takes up against a resilient member which also cooperates with the clamp which holds the device in operative position on the brake pedal lever so that the clamp and adjustment are provided with an automatic takeup which avoids the necessity for a positive definite tightening of either the clamp or the adjustment to the final position of operation. In this way loosening and rattling and loss of adjustment are avoided and greater facility and speed of clamping and adjustment are attained.

In the accompanying drawing I have illustrated a clutch and brake control combining mechanism in accordance with my invention, together with so much of the mechanical features of a motor vehicle as is necessary to a full understanding of the invention and method of applying and using the same.

In the drawing:

Figure 1 is a perspective view of the brake and clutch control levers and pedals together with the steering column and adjacent parts which are shown fragmentarily, the toe board or foot board and the floor board being omitted for convenience of illustration.

Figure 2 is a plan of the control combining device in operative position, the clutch and brake levers being shown in section.

Figure 3 is a section on the line 3, 3 in Figure 2.

Referring to the drawing by numerals each of which is used to indicate the same or similar parts in the different figures, the construction shown includes a chassis fore and aft frame member 1, the steering column 2, gear shift lever 3, transmission housing 4, and clutch housing 5. The clutch control or pedal lever 6, and the brake control or pedal lever 7 are mounted on the usual transverse pedal shaft 8' and extend upwardly therefrom through the foot board or toe board not shown, being adapted to swing in the operation of the clutch and brakes through an arc of some twenty to thirty degrees from the normal position of released brakes and engaged clutch in which they are shown.

The respective clutch and brake pedal levers are provided at their upper ends with foot pedals 8 and 9, respectively. Illustration of the clutch and brake mechanism has been omitted as unnecessary, the pedal levers 6 and 7 being adapted for use with any type of brake or clutch. The combining mechanism of the invention comprises a clamp 10 for attachment to the brake control pedal 7 and a laterally extending universally adjustable actuating arm 11, which is secured by the clamp to the brake lever extending into the path of the clutch lever for engagement by the clutch lever 6 for the operation of the brake on further downward motion of the clutch pedal after the clutch is released.

The brake and clutch control combining mechanism indicated in a general way by reference character 12 further includes a body or frame member 14 which may be described as of L shape as seen in Figure 2, and a tilting clamping plate 15, together comprising the clamp 10. The combining device also includes a resilient member 17 and adjusting screw 18. This adjusting screw cooperates with the resilient member 17 to position and lock the actuating arm 11 at such a point in the path of the clutch lever 6 as to effect the application of the brakes after the clutch is released, and when the clutch pedal is depressed below the clutch releasing position to the desired extent.

The clamping plate 15 is operated by a bolt 19 which is secured at its threaded end to the body member 14 which is shown as of channel shaped cross section and consisting of an upright leg 14' and a transverse leg 13. The bolt 19 extends transversely of the vehicle and is passed through the tilting clamping plate 15 near the center of its length and through the upright leg 14' of the body member 14 just below the brake lever 7, being provided outside the frame member 14 with a nut 20 located in the channel. As shown, the upper end portion of the leg 14' of the L shaped body member 14 is concave toward this plate as to the portion of said leg above the bolt 19. This concavity partially encloses lever 7 and provides for a convenient, and secure engagement of the brake pedal lever or brake control lever 7 by the clamp 10. The tilting plate 15 is provided on the opposite side of the bolt 19 from the arm 15' which engages the brake lever with a stud 23 which extends toward the upright arm 14' of the body member 14 and transversely of the vehicle. This stud serves as a pivotal mounting for the actuating arm 11 which is provided with a foot 21 substantially at right angles to said arm. This foot is apertured at 22 to receive the stud, the aperture being large enough to provide for free movement of the arm 11 relatively to the stud, both by rotating about the stud and rocking on plate 15. The stud 23 projects beyond the foot 21, providing means for holding the resilient member 17 which is shown in the form of a rubber block which is centrally apertured for this purpose at 24. The actuating arm 11 extends transversely of the vehicle and in working position to the left of the vehicle though it is shown as extending to the right in Figure 2 which is a view looking backwardly into the vehicle. This actuating arm is shown as having a shoulder or offset 24' spaced a convenient distance, possibly an inch or two, from the foot 21, and immediately beyond this offset the lever is engaged from below as shown in Figure 2 by the adjusting screw 18 extending through the end of transverse leg 13 of the L shaped body member 14. This adjusting screw is most conveniently threaded through the body member 14 and provided with a lock nut 26 adjacent the body member by which it is held in adjusted position.

In operation the brake and clutch control combining unit is clamped to the brake lever 7 as shown, the concave portion 14' of the body member engaging the side of the brake lever 7 which is remote from the clutch lever 6, the clamping end 15' of the plate 15 engaging the brake lever from the opposite side. When the mechanism has been thus engaged with the brake lever, the screw 19 is tightened until the brake and clutch control combining mechanism is clamped sufficiently to hold it in position.

It will be understood that when the nut 19 is tightened the plate 15 bears at one side or end on the brake lever 7 and is supported at the other side or end by foot 21 resting on the resilient member 17 giving a resilient engagement of the combining mechanism with the brake lever. The arm 11 is then so adjusted as to be engaged by the clutch pedal 6 only when the clutch has been released, and the pedal is further depressed to operate the brake. The resilient member yields to the foot 21, giving any desired adjustment of the actuating arm 11 in the direction of motion of the clutch pedal. The actuating arm 11 may also be rotated about the stud 23 before tightening the bolt 19 so as to bring its top surface into a plane parallel to the bottom surface of the clutch pedal lever 6 in contacts position.

The length of the actuating arm 11 extending transversely of the pedal levers 6 and 7 provides for any spacing of these levers without adjustment, and the mounting of the lever on the stud 21 and on resilient member 17 provides for both rotary or angular adjustment of the arm 11 into a plane parallel to the plane of the clutch lever and an up and down adjustment of the arm 11 by means of screw 18 operating in parallel to the plane of motion of the clutch pedal so as to effect the application of the brake at any desired position of the clutch pedal, below the point of release of the clutch. It also provides for any desired change or to meet changes of the condition of the clutch and is accomplished by a mere turning of screw 18, change of the adjustment of screw 19 being generally unnecessary. This method of adjustment has great advantages over the constructions which require unclamping and repositioning of the parts and reclamping in order to effect the desired adjustments.

We have thus described in detail a brake and clutch control combining device embodying the invention, the description being specific and in detail in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. A brake and clutch control combining device comprising an L shaped body member, having an upright leg, a tilting clamping plate parallel to the upright leg of the L, a screw engaging said leg and said plate intermediately to clamp the brake lever between said leg and the plate above the screw, an actuating arm having a foot pivoted to said plate to rock relatively to said plate, a resilient member between said foot and said leg of the L, the plate overlying the foot oppositely to the resilient member, the actuating arm extending laterally from the brake lever beneath the clutch lever and an adjusting screw carried by the other leg of the L and engaging the actuating arm from beneath, providing for rotary adjustment of the actuating arm about the axis of the pivot and adjustment of the same toward and from the clutch lever.

2. A brake and clutch control combining device comprising a transverse actuating arm, means for clamping the same to the brake pedal so that it extends laterally therefrom beneath the clutch pedal and has a limited oscillation about the clamp in a plane transverse to the clutch pedal, the clamp comprising a body member carrying a resilient support for said arm and a screw applying pressure to said arm oppositely to said resilient member whereby it may be adjusted toward and from said clutch pedal in said plane.

3. A brake and clutch control combining device comprising a transverse actuating arm, means for clamping the same to the brake pedal lever so that it extends laterally beneath the clutch pedal lever and has a limited oscillation about the clamp in a plane transverse to the clutch pedal lever the clamp comprising a body member carrying a resilient support for said arm and a screw for applying stress to said arm oppositely to the tendency of said resilient support whereby said actuating arm may be adjusted toward and from said clutch pedal lever, the actuating arm being also mounted for rotary adjustment substantially about its long axis and having means whereby it is secured in various positions of angular adjustment about said axis whereby it is adjusted with its surface to be engaged by said clutch pedal lever parallel to the corresponding surface of said clutch pedal lever in the position of engagement.

4. In a brake and clutch control combining device, an actuating arm, a clamping screw and rocking member for attaching the arm to one control lever so it extends into the path of the other control lever screw means for applying an adjusting stress to one side of the arm and a resilient member supporting said arm and said rocking member oppositely to said screws.

WILLIAM FETTER.